Patented Jan. 24, 1928.

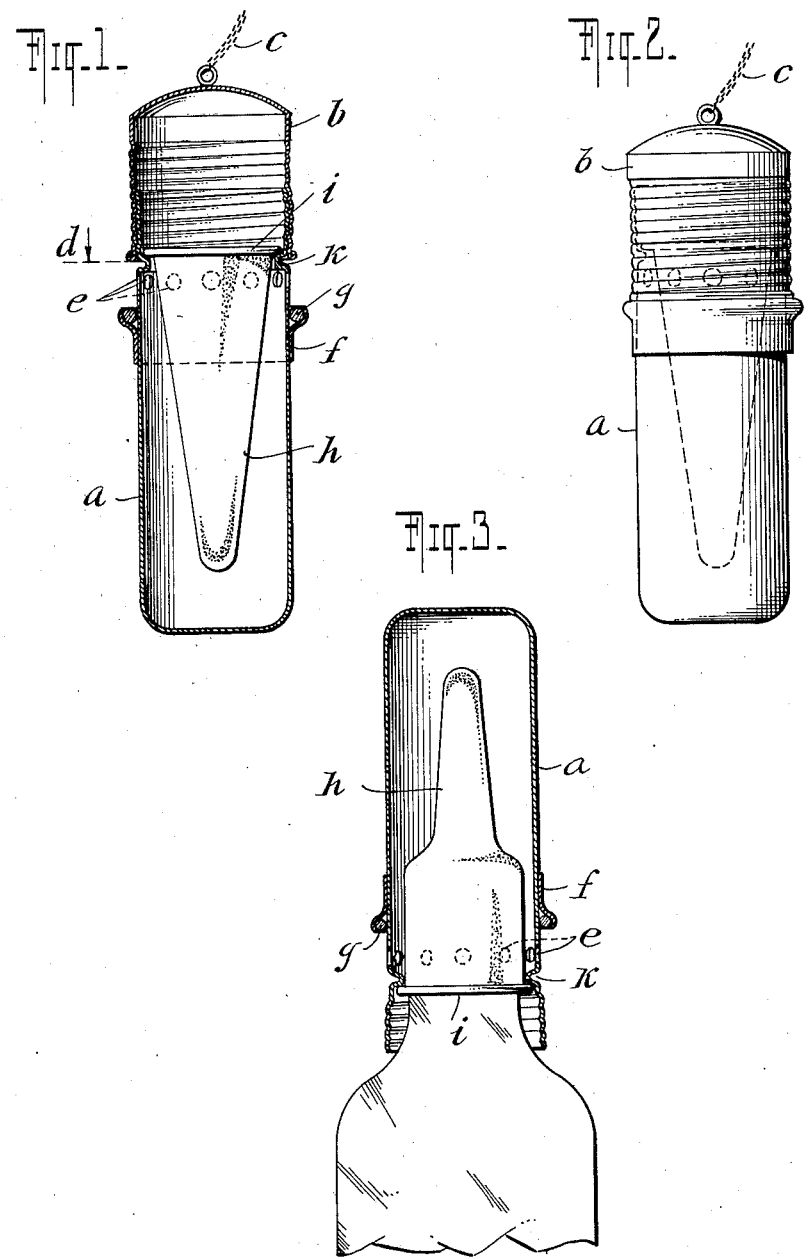

1,657,050

UNITED STATES PATENT OFFICE.

KURT WALTER, OF BERLIN, GERMANY, ASSIGNOR TO DR. MED. KAISER KINDER-SAUGER-STERILISATOR GESELLSCHAFT MIT BESCHRANKTER HAFTUNG, OF BERLIN, GERMANY, A GERMAN FIRM.

POCKET STERILIZER FOR NURSING NIPPLES.

Application filed September 30, 1925, Serial No. 59,679, and in Germany October 5, 1924.

This invention relates to a container for sterilizing children's nipples, and has for its object to provide a container adapted to receive the sterilizing liquid, and permit the liquid to completely surround the nipple, and also adapted to serve as a boiling vessel that can be closed for the sterilizing operation, and serve also as a storage receptacle for the sterilized nipple.

Those and other objects apparent to those skilled in the art, are accomplished by the means hereinafter described and illustrated in the accompanying drawing, which shows the invention in its preferred form, but it is to be understood that changes, modifications and alterations may be made therein without departing from the invention.

In the accompanying drawing in which similar reference letters indicate corresponding parts throughout the several views Figure 1 is a side elevation of a device embodying the invention showing the parts as ready for boiling;

Figure 2 is a side elevation of the device of Figure 1 with the parts arranged as after boiling; and Figure 3 is a side elevation of the nipple container shown at the moment the nipple is placed on the opening of the bottle.

As shown in the drawing, the nipple container $a$ is provided with a cover $b$, to which is attached a fastening chain $c$.

The container $a$ is provided with apertures $e$, which serve for the admission of the sterilizing liquid, and with an annular band $f$ having secured to the upper edge thereof a sealing ring $g$ to make a close joint with the cover $b$.

The upper portion of the container is provided with an inwardly extending shoulder $k$ and above said shoulder the upper end of said container is fluted in the form of threads to engage corresponding threads on the wall of the cover $b$.

When the parts are assembled for sterilizing the nipple is placed downward within the container $a$ with its fastening ring $i$ resting on the inwardly projecting shoulder $k$, the cover $b$ is screwed to the lowest thread $d$ of the container; thereupon the closed container $a$ is placed in a vessel filled with water or is suspended, by means of the chain $c$, in such a manner that the closed container $a$ is completely surrounded by water; thereupon the water container in the vessel is brought to a boil.

The holes $e$ permit the entering of the water into the container $a$. By the boiling, there is obtained a continuous circulation of the water in the container $a$ and in this way a complete sterilization of the nipple $h$.

After the boiling, the receptacle $a$ is lifted from the boiling vessel by means of the chain $c$ and the cover $b$ is screwed up to sealing ring $g$ which assures in this connection an air and water tight closure.

In this manner the nipple, after being sterilized is touched by hand only when it is to be placed on the milk bottle. However, the nipple need not be touched by hand even then, inasmuch as after the removal of the sterile liquid, the entire container is placed, with a slight pressure, on the milk bottle and again immediately removed so that now only the nipple rests on the bottle without it having been touched by hand. The holder $i$ can remain on the nipple or it can be placed again in the receptacle $a$.

In connection with nipples having an end extension, the holder $i$ is not required.

The support $k$ can be formed by an inserted ring or by a projection, but most suitably it is formed by an annular shoulder formed in the body of the container.

What is claimed is:

1. A container for use in sterilizing nursing nipples and like articles, including a body in which a nipple may be supported and which is provided with a plurality of apertures to permit circulation of a liquid into and out of said body while the nipple is being sterilized, a sealing ring carried by said body, and a cover for the body adjustable thereon to a position where said openings will be uncovered during the sterilization of said nipple, said cover being also adjustable to close said openings and engage said sealing ring after the nipple has been sterilized.

2. A container for use in sterilizing nursing nipples and like articles, including a body in which a nipple may be supported and which is provided with a plurality of apertures to permit circulation of a liquid into and out of said body while the nipple is being sterilized, said body also having a screw threaded open end, a cover for said body engaged with the screw threads thereof and movable to positions on said body where the same will close and uncover said openings, and a sealing ring carried by said body and with which said cover is engageable when the same closes said openings to render said body airtight.

In testimony whereof, I have affixed my signature.

KURT WALTER.